United States Patent
Chen et al.

(10) Patent No.: US 12,096,255 B2
(45) Date of Patent: Sep. 17, 2024

(54) LINK MEASUREMENTS FOR VEHICULAR DEVICE-TO-DEVICE LINKS

(71) Applicant: ZTE Corporation, Guangdong (CN)

(72) Inventors: Lin Chen, Guangdong (CN); Wei Luo, Guangdong (CN); Mengzhen Wang, Guangdong (CN)

(73) Assignee: ZTE Corporation, Shenzhen (CN)

( * ) Notice: Subject to any disclaimer, the term of this patent is extended or adjusted under 35 U.S.C. 154(b) by 326 days.

(21) Appl. No.: 17/397,868

(22) Filed: Aug. 9, 2021

(65) Prior Publication Data

US 2021/0368372 A1 Nov. 25, 2021

Related U.S. Application Data

(63) Continuation of application No. PCT/CN2019/075115, filed on Feb. 14, 2019.

(51) Int. Cl.
*H04W 24/08* (2009.01)
*H04W 24/10* (2009.01)
(Continued)

(52) U.S. Cl.
CPC ........... *H04W 24/08* (2013.01); *H04W 24/10* (2013.01); *H04W 76/14* (2018.02); *H04W 76/30* (2018.02); *H04W 4/40* (2018.02)

(58) Field of Classification Search
CPC ..... H04W 24/08; H04W 24/10; H04W 76/14; H04W 76/30; H04W 4/40
See application file for complete search history.

(56) References Cited

U.S. PATENT DOCUMENTS

| 10,873,895 B2 | 12/2020 | Agiwal et al. |
| 10,979,960 B2 | 4/2021 | Wang et al. |

(Continued)

FOREIGN PATENT DOCUMENTS

| CN | 102334370 A | 1/2012 |
| CN | 103179669 A | 6/2013 |

(Continued)

OTHER PUBLICATIONS

Indonesian office action issued in ID Patent Application No. P00202107502, dated Sep. 22, 2023, 6 pages. English translation included.

(Continued)

*Primary Examiner* — Chae S Lee
(74) *Attorney, Agent, or Firm* — Perkins Coie LLP

(57) ABSTRACT

Methods, systems, and devices for link measurements of vehicular device-to-device links in mobile communication technology are described. An exemplary method for wireless communication includes receiving, by a first wireless device, a device-to-device link measurement configuration, and performing a device-to-device link measurement procedure. Another exemplary method for wireless communication includes receiving, by a first wireless device, a device-to-device link monitoring configuration, and performing a device-to-device link monitoring procedure. Yet another exemplary method for wireless communication includes receiving, by a first wireless device, a device-to-device link maintenance configuration, and performing a device-to-device link maintenance procedure.

20 Claims, 12 Drawing Sheets

(51) Int. Cl.
  *H04W 76/14*  (2018.01)
  *H04W 76/30*  (2018.01)
  *H04W 4/40*   (2018.01)

(56) References Cited

U.S. PATENT DOCUMENTS

| | | | |
|---|---|---|---|
| 2012/0106517 A1 | 5/2012 | Charbit et al. | |
| 2014/0057670 A1* | 2/2014 | Lim | H04W 48/16 455/509 |
| 2015/0334757 A1 | 11/2015 | Seo | |
| 2016/0212645 A1* | 7/2016 | Uemura | H04W 24/08 |
| 2020/0205209 A1* | 6/2020 | Pan | H04W 72/51 |
| 2021/0289380 A1* | 9/2021 | Chae | H04W 72/54 |
| 2022/0061112 A1* | 2/2022 | Vutukuri | H04W 4/70 |
| 2022/0124678 A1* | 4/2022 | Lee | H04W 72/23 |

FOREIGN PATENT DOCUMENTS

| | | |
|---|---|---|
| CN | 104885500 A | 9/2015 |
| CN | 107113713 A | 8/2017 |
| CN | 108631889 A | 10/2018 |
| EP | 3416436 A1 | 12/2018 |
| EP | 3 605 859 A1 | 2/2020 |
| WO | 2015/163668 A1 | 10/2015 |
| WO | 2018010123 A1 | 1/2018 |
| WO | 2018204863 A1 | 11/2018 |

OTHER PUBLICATIONS

European Search Report for EP Patent Application No. 19915090.5 dated Sep. 7, 2022, 10 pages.
Indian Examination Report issued in IN Patent Application No. 202147041325, dated Jan. 11, 2023, 6 pages.
International Search Report and Written Opinion mailed on Nov. 18, 2019 for International Application No. PCT/CN2019/075115, filed on Feb. 14, 2019 (8 pages).
European Communication under Rule 71(3) EPC issued in EP Patent Application No. 19915090.5, dated Feb. 6, 2024, 44 pages.
Korean office action issued in KR Patent Application No. 10-2021-7028977, dated May 16, 2024, 9 pages. English translation included.
LG Electronics, "Feature lead summary for agenda item 7.2.4.1.2 Physical layer procedures," 3GPP TSG RAN WG1 Ad-Hoc Meeting 1901, R1-1901439, Taipei, Taiwan, Jan. 21-25, 2019, 18 pages.
3GPP TS 36.331 V13.10.0 (Jun. 2018), Technical Specification, 3rd Generation Partnership Project; Technical Specification Group Radio Access Network; Evolved Universal Terrestrial Radio Access (E-UTRA); Radio Resource Control (RRC); Protocol specification (Release 13); 645 pages.
European Communication under Rule 71(3) EPC issued in EP Patent Application No. 19915090.5, dated Jul. 2, 2024, 42 pages.

* cited by examiner

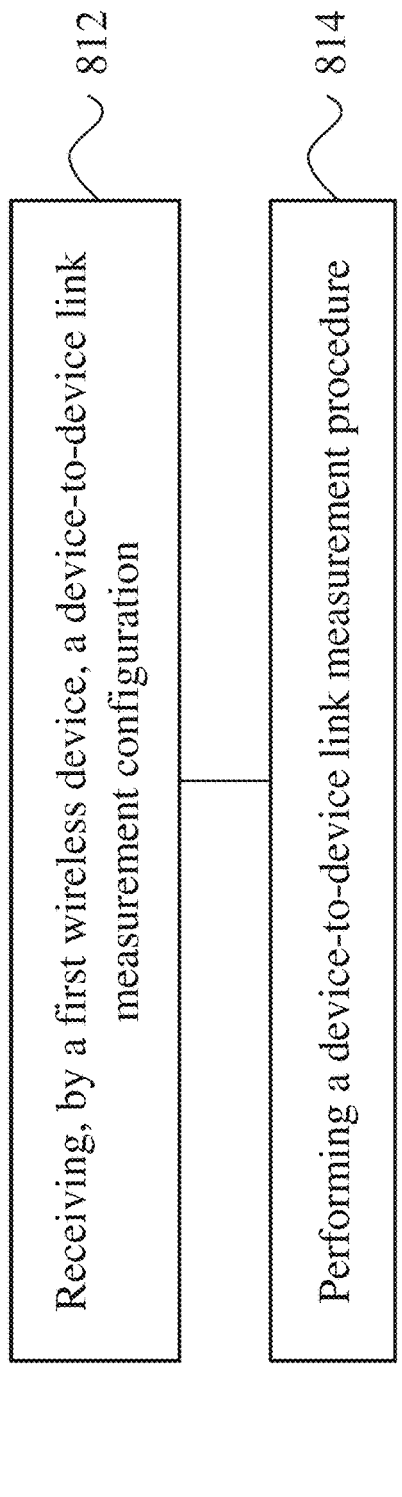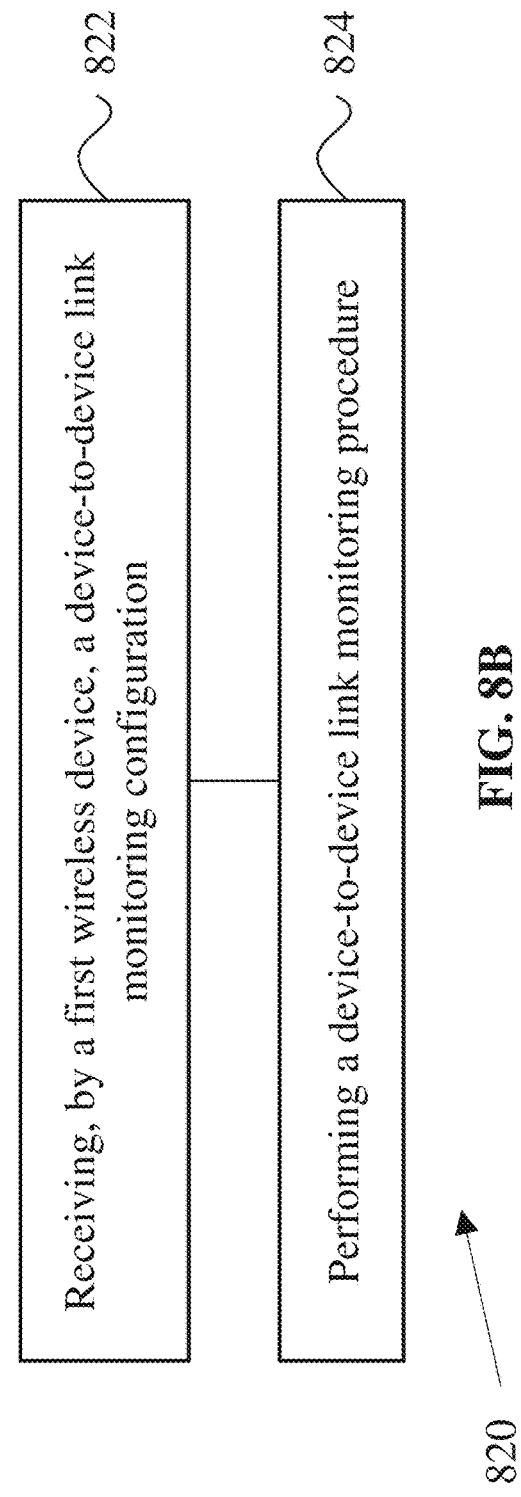
FIG. 8A
FIG. 8B

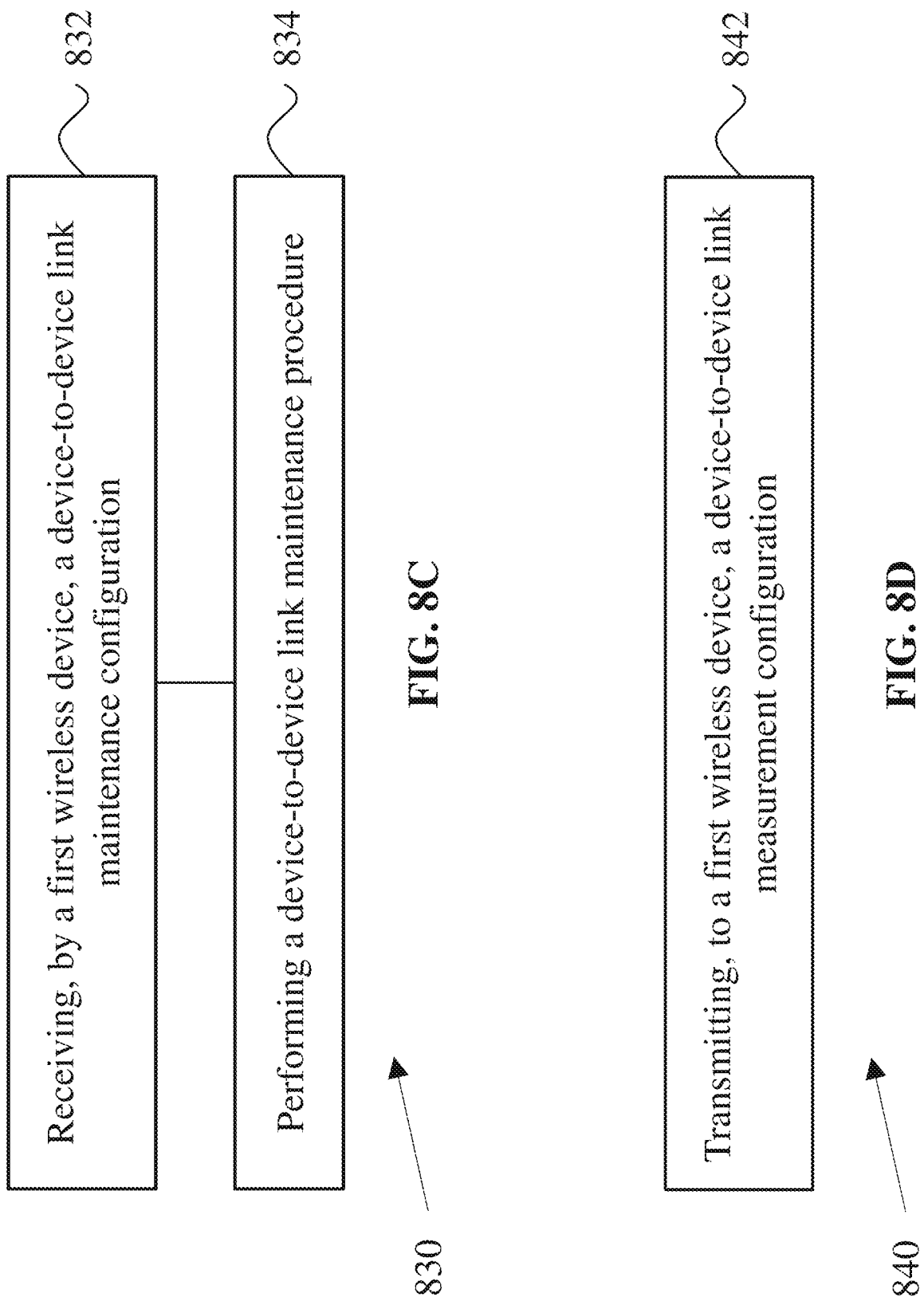

850

Transmitting, to a first wireless device, a device-to-device link measurement configuration — 852

Transmitting, to a first wireless device, a device-to-device link measurement configuration — 862

FIG. 8F

LINK MEASUREMENTS FOR VEHICULAR DEVICE-TO-DEVICE LINKS

CROSS-REFERENCE TO RELATED APPLICATIONS

This application is a continuation of International Patent Application No. PCT/CN2019/075115, filed on Feb. 14, 2019, the contents of which are incorporated herein by reference in their entirety.

TECHNICAL FIELD

This document is directed generally to wireless communications.

BACKGROUND

Wireless communication technologies are moving the world toward an increasingly connected and networked society. The rapid growth of wireless communications and advances in technology has led to greater demand for capacity and connectivity. Other aspects, such as energy consumption, device cost, spectral efficiency, and latency are also important to meeting the needs of various communication scenarios. In comparison with the existing wireless networks, next generation systems and wireless communication techniques need to provide support for an increased number of users and devices, as well as support for higher data rates, thereby requiring user equipment to implement link measurement procedures for vehicular device-to-device links.

SUMMARY

This document relates to methods, systems, and devices for generating sequences for reference signals in mobile communication technology, including 5th Generation (5G) and New Radio (NR) communication systems.

In one exemplary aspect, a wireless communication method is disclosed. The method includes receiving, by a first wireless device, a device-to-device link measurement configuration, and performing a device-to-device link measurement procedure.

In another exemplary aspect, a wireless communication method is disclosed. The method includes receiving, by a first wireless device, a device-to-device link monitoring configuration, and performing a device-to-device link monitoring procedure.

In yet another exemplary aspect, a wireless communication method is disclosed. The method includes receiving, by a first wireless device, a device-to-device link maintenance configuration, and performing a device-to-device link maintenance procedure.

In yet another exemplary aspect, a wireless communication method is disclosed. The method includes transmitting, to a first wireless device, a device-to-device link measurement configuration, wherein the first wireless device is enabled to perform a device-to-device link measurement procedure.

In yet another exemplary aspect, a wireless communication method is disclosed. The method includes transmitting, to a first wireless device, a device-to-device link monitoring configuration, wherein the first wireless device is enabled to perform a device-to-device link monitoring procedure.

In yet another exemplary aspect, a wireless communication method is disclosed. The method includes transmitting, to a first wireless device, a device-to-device link maintenance configuration, wherein the first wireless device is enabled to perform a device-to-device link maintenance procedure.

In yet another exemplary aspect, the above-described methods are embodied in the form of processor-executable code and stored in a computer-readable program medium.

In yet another exemplary embodiment, a device that is configured or operable to perform the above-described methods is disclosed.

The above and other aspects and their implementations are described in greater detail in the drawings, the descriptions, and the claims.

BRIEF DESCRIPTION OF THE DRAWINGS

FIGS. 8A-8F show examples of wireless communication methods, in accordance with some embodiments of the presently disclosed technology.

DETAILED DESCRIPTION

There is an increasing demand for fourth generation of mobile communication technology (4G, the 4th Generation mobile communication technology), Long-term evolution (LTE, Long-Term Evolution), Advanced long-term evolution (LTE-Advanced/LTE-A, Long-Term Evolution Advanced) and fifth-generation mobile communication technology (5G, the 5th Generation mobile communication technology). From the current development trend, 4G and 5G systems are studying the characteristics of supporting enhanced mobile broadband, ultra-high reliability, ultra-low latency transmission, and massive connectivity.

With the increase in the number of vehicles, people pay more and more attention on how to reduce traffic accidents, how to provide timely assistance, how to coordinate on-site traffic, etc. With the development of communication and electronic technology, more and more vehicles are equipped with vehicle communication modules. Through such vehicle equipment there can be a variety of information exchange, such as accident pre-warning information, traffic status reminder information and so on. In addition to the V2X service for basic safety, more advanced V2X services are specified. For example the advanced V2X services can be divided into four categories: vehicle platooning, extended sensors, semi-automated or full-automated driving, and remote driving. These advanced V2X services have a wide variety of performance requirement, such as, data packet sizes between 50 and 12000 bytes, data rates between 0.5 and 1000 Mbps, maximum end-to-end latency between 3 and 500 ms, reliability between 90% and 99.999%, and transmission ranges between 50 and 1000 m.

Figure 1:
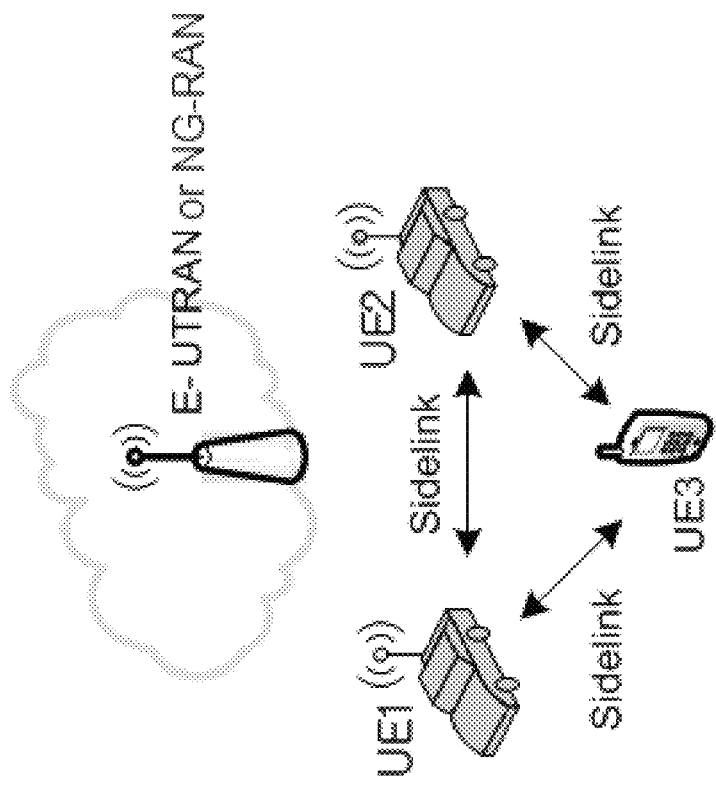
FIG. 1 shows an examples of V2X device-to-device link communication.

Vehicle communication can be divided into three types: Vehicle-to-Vehicle (V2V) Communications, Vehicle-to-Pedestrian (V2P) Communications and Vehicle-to-Infrastructure or Network (V2I or V2N) Communications. In 3GPP, device-to-device link based (also referred to as a sidelink in this document, with the terms being used interchangeably) V2X communication is supported, wherein the data packet is transmitted from source UE to target UE directly via a radio interface as shown in FIG. 1. It is not necessary to go through the base station or core network. This type of communication is referred to as PC5-based V2X communication or V2X sidelink communication.

Figure 2:
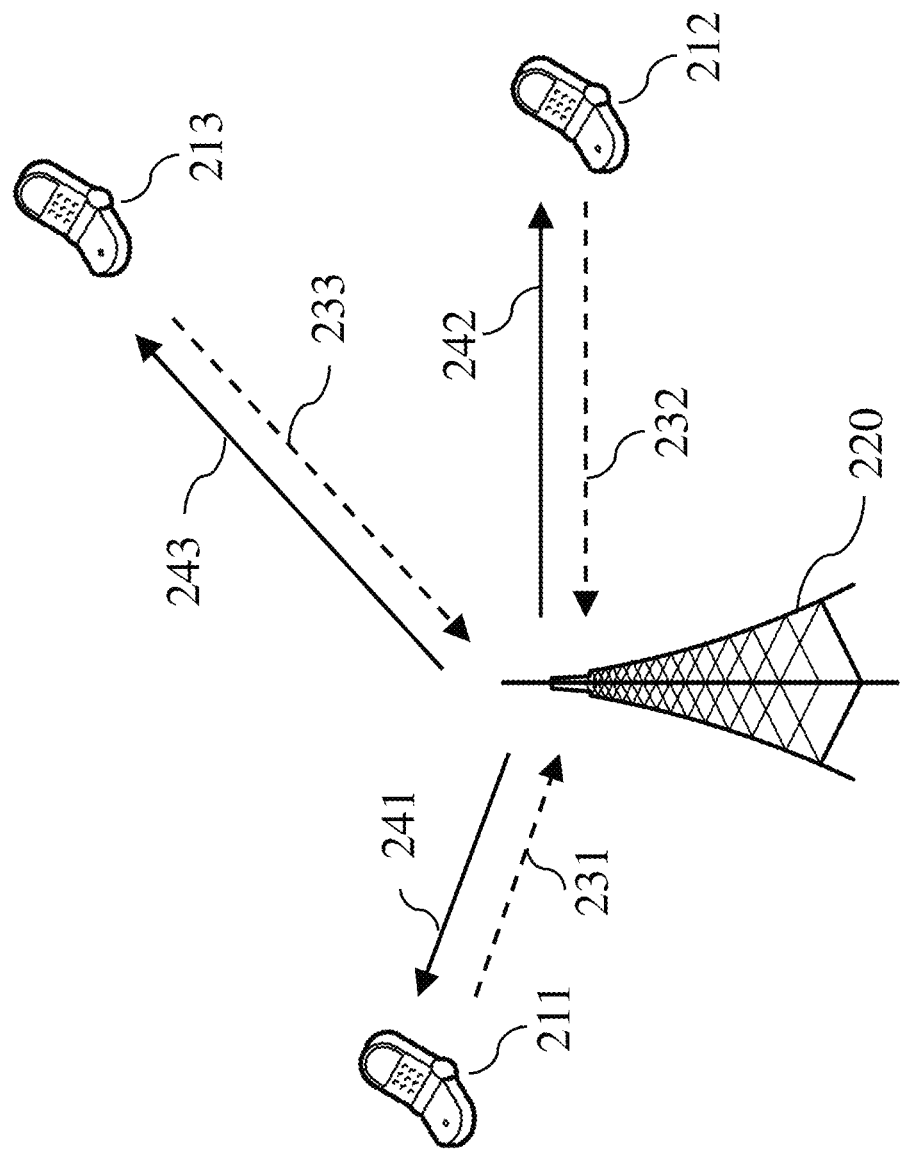
FIG. 2 shows an example of a base station (BS) and user equipment (UE) in wireless communication, in accordance with some embodiments of the presently disclosed technology.

Embodiments of the disclosed technology include methods for sidelink measurements and sidelink connection management. FIG. 2 shows an example of a wireless communication system (e.g., an LTE, 5G or New Radio (NR) cellular network) that includes a BS 220 and one or more user equipment (UE) 211, 212 and 213. In some embodiments, the transmissions (241, 242, 243) from the BS to the UEs include a measurement configuration that enables a UE to perform a device-to-device link measurement. The UE may be, for example, a smartphone, a tablet, a mobile computer, a machine to machine (M2M) device, a terminal, a mobile device, an Internet of Things (IoT) device, and so on.

The present document uses section headings and subheadings for facilitating easy understanding and not for limiting the scope of the disclosed techniques and embodiments to certain sections. Accordingly, embodiments disclosed in different sections can be used with each other. Furthermore, the present document uses examples from the 3GPP New Radio (NR) network architecture and 5G protocol only to facilitate understanding and the disclosed techniques and embodiments may be practiced in other wireless systems that use different communication protocols than the 3GPP protocols.

Exemplary Embodiments for Link Measurements of Vehicular Sidelinks

V2X sidelink communications include sidelink unicast, sidelink groupcast and sidelink broadcast communications. For sidelink unicast, UEs need to discover each other and then setup the PC5 connection. On the other hand, for sidelink groupcast, it is also necessary for a group member UE to setup PC5 connection with group header UE in some group communication scenarios. During this procedure, the UE needs to discover its peer UE first, then detect the link quality, and finally setup PC5 connection. After the establishment of the PC5 connection, the UE may still need to perform sidelink measurements to detect the link quality and/or adjust the beam in high-frequency scenarios. Once the link quality deteriorates to some extent, the UE may need to release the PC5 connection.

Examples of PC5 Link Setup

Figures 3A, 3B:
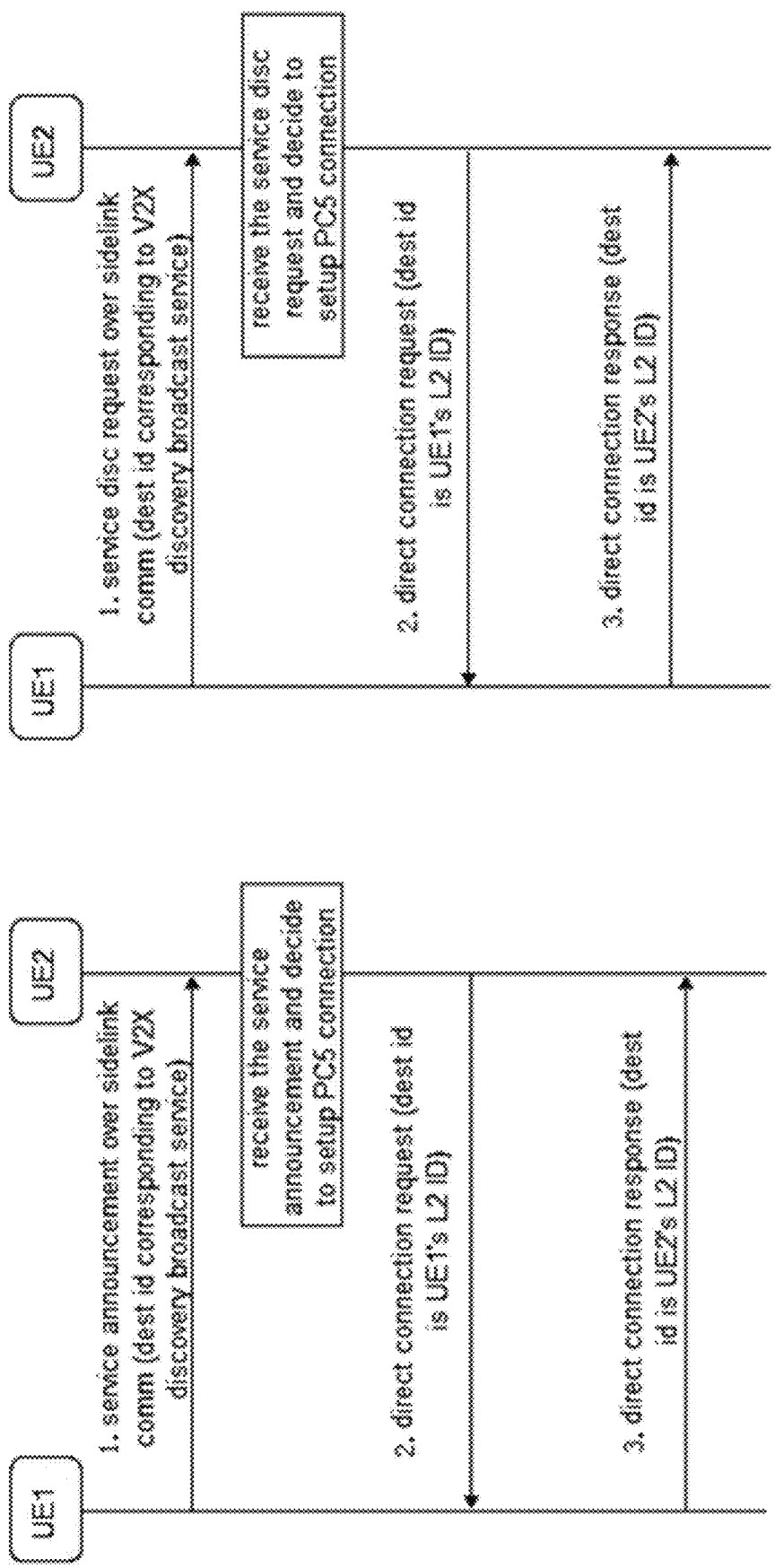
FIGS. 3A, 3B and 3C show examples of establishing a PC5 connection.

In some embodiments, sidelink unicast communications usually require two UEs that perform unicast communication to discover each other first, and then initiate unicast-based sidelink V2X communication. In addition, for some sidelink group communication scenarios, a unicast communication between the group header and the group member is also required. Generally, before initiating a unicast communication, the UE needs to first discover its peer UE and determine whether the link quality between them is sufficient for unicast communications. For example, the following implementations may be used:

As shown in FIG. 3A, the UE interested in a PC5 unicast communication periodically sends a service announcement, which includes the discovery type, which types of services are supported, the corresponding application layer ID and other service attribute information. The UE can transmit the information by using the V2X sidelink broadcast communication mechanism. In some embodiments, the V2X discovery can be transformed into a general V2X broadcast service, and the independent application identifier and the corresponding PSID/ITS-AID may be allocated. The V2X layer derives the destination Layer 2 (L2) ID and QoS parameters according to the application identifier or the PSID/ITS-AID mapping, and then delivers the discovery message, the destination L2 ID, the QoS parameter and the source L2 ID to the AS layer. The AS layer creates a corresponding logical channel based on the information, assembles the MAC PDU, and requests the sidelink communication resource to send the discovery message.

After receiving the information, other UEs interested in the V2X discovery broadcast service parse the source L2 ID, the logical channel identifier, and create a corresponding receiving logical channel entity. In addition, the AS layer may record its corresponding beam identifier or reference signal identifier corresponding to the source L2 ID. After the AS layer processing has been completed, the AS layer delivers the message to the V2X layer. The V2X layer parses out the application identifier, the service attribute, and additionally determines whether to initiate a unicast communication. If it is determined that a unicast communication is to be initiated, the V2X layer sends a PC5 connection establishment indication to the AS layer, which may include a destination ID corresponding to the source L2 ID information of the service announcement message. At this time, the AS layer may send the unicast PC5 connection establishment request information in the corresponding beam direction according to the beam identifier corresponding to the previously recorded source L2 ID.

As shown in FIG. 3B, if UE1 has previously discovered UE2, UE1 may send a service discovery request message, which may include a discovery type, which types of services are supported, an application layer ID of UE1 and UE2, business attribute information, etc. UE1 transmits the information by using a V2X sidelink broadcast communication mechanism, and allocates an application identifier or a PSID/ITS-AID corresponding to the V2X broadcast. The V2X layer derives the destination L2 ID and QoS parameters according to the application identifier or the PSID/ITS-AID mapping, and then delivers the discovery message, the destination L2 ID, the QoS parameter, and the source L2 ID to the AS layer. The AS layer creates a corresponding logical channel based on the information, assembles the MAC PDU, and requests the sidelink communication resource to send the discovery message.

After receiving the information, other UEs interested in the V2X broadcast service parse the source L2 ID, the logical channel identifier, and create a corresponding receiving logical channel. The AS layer delivers the message to the V2X layer. The V2X layer parses the UE1 and UE2 application identifiers, service types, service attributes, etc. to determine whether it is the UE that UE1 is looking for. If it is, UE2 can reply to the service discovery response. The message directly initiates a unicast connection setup request message to UE1. The V2X layer sends a PC5 connection establishment indication to the AS layer.

Figure 3C:
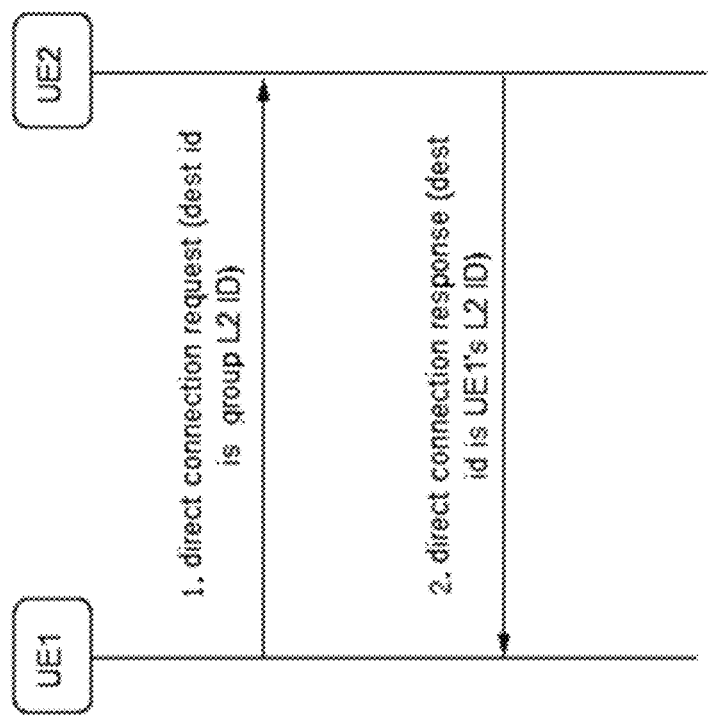

In FIG. 3C, it is assumed that UE1 and UE2 belong to a single group, UE2 is a group header, UE1 is a group member, and UE1 and UE2 know the Group L2 ID to which they belong. It is further assumed that UE1 wants to establish a unicast connection with the group header UE2, and may send a PC connection establishment request message, where the message may include a group header indication, a corresponding Group L2 ID, an application layer identifier of the UE2, and other service attribute information. UE1 may send the information using the V2X sidelink broadcast communication mechanism, or may send the information through a multicast mechanism, for example, setting the destination L2 ID to the Group L2 ID. The V2X layer then delivers the message, the destination L2 ID, the QoS parameter, and the source L2 ID to the AS layer. The AS layer creates a corresponding logical channel based on the information, assembles the MAC PDU, and requests the sidelink communication resource to send the discovery message. It is assumed that after receiving the PC5 connection establishment request sent by the UE1, the UE2 determines that it is the group header that the UE1 is looking for, and then replies to the PC5 connection establishment response message.

Figure 4:
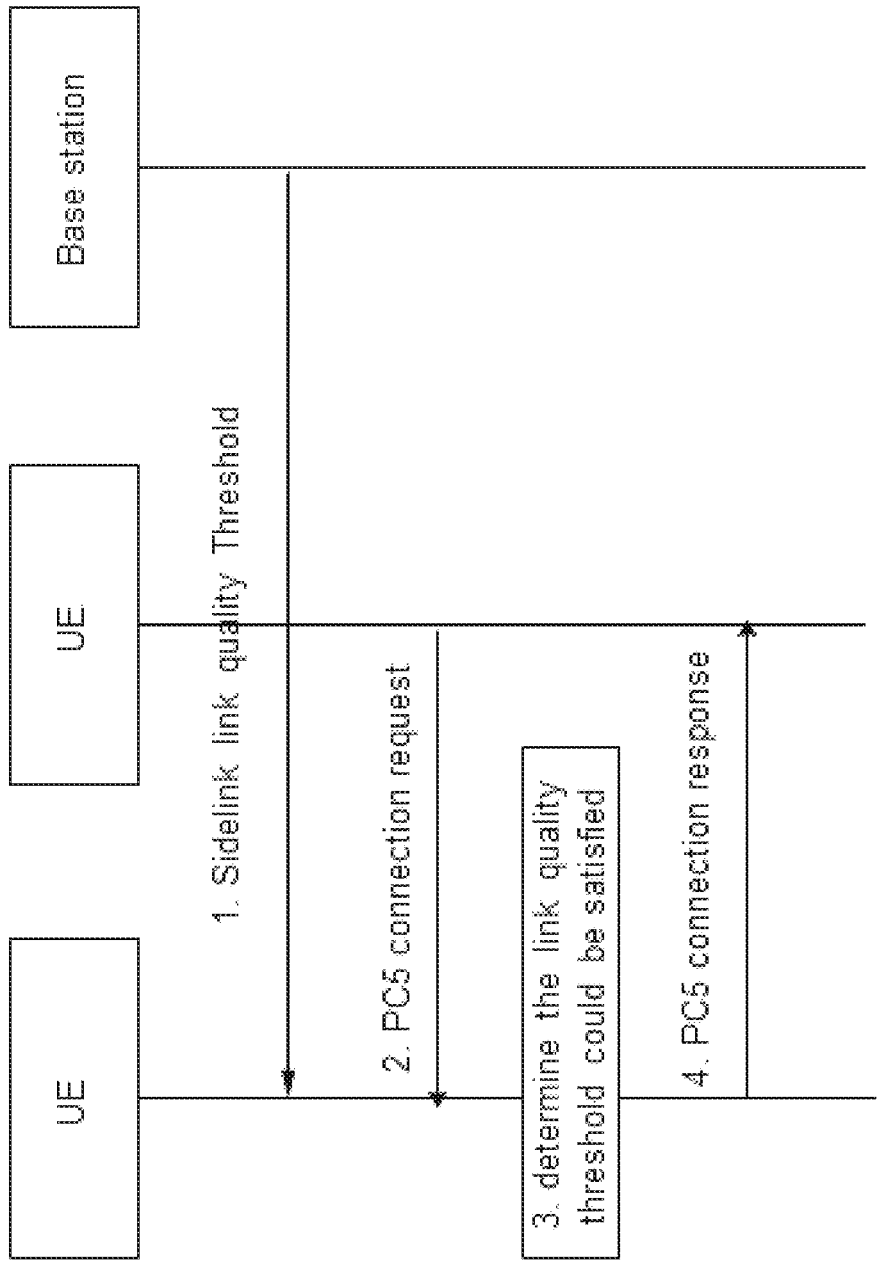
FIG. 4 shows an example of a PC5 connection setup procedure.

In some embodiments, the UE can receive or pre-configure the sidelink link quality threshold from the base station, as shown in FIG. 4. After receiving the request message sent by the UE, the UE performs RSRP/RSRQ measurement on the received discovery message or PC5 connection establishment request message. Since the MAC/PHY layer of the discovery message or PC5 connection setup request message carries the source L2 ID and the destination L2 ID, the AS layer can perform Layer 3 (L3) filtering on multiple discovery messages from the same UE to obtain RSRP/RSRQ measurement of the sidelink.

In some embodiments, if the discovery message or the PC5 connection setup request message is initiated by the AS layer, the UE determines whether the sidelink measurement result satisfies the threshold configuration of the base station configuration or pre-configuration, and if so, sends a connection establishment request message or a PC5 connection establishment response message. On the other hand, if the above discovery message or the PC5 connection establishment related message is triggered by the upper layer, there are several ways to consider the sidelink measurement result, which include:

1) The AS layer determines whether the link quality threshold for unicast communication is satisfied according to the sidelink measurement result, and only delivers the discovery information to the upper layer when the quality threshold is met.

2) The AS layer informs the upper layer whether the corresponding sidelink measurement result can satisfy the unicast communication requirement.

3) The successfully decoded discovery message is sent to the upper layer, and the upper layer determines whether the AS layer further determines whether the link quality threshold is met when the PC5 unicast link is established.

In some embodiments, the UE needs to first discover its peer UEs on the PC5 interface, and the link quality needs to meet the reliability requirements before the sidelink unicast communication is performed. For sidelink unicast communication, the UE may perform measurements by combining the discovery message and the connection establishment related message, and determine whether to initiate or accept the unicast connection establishment request according to whether the measurement result satisfies the sidelink link quality threshold.

Examples of Device-to-Device Link Measurements

In existing implementations, the device-to-device link measurement has been defined for some exemplary uses. In an example, the measurement of the sidelink synchronization signal is used for UE type synchronization source selection and/or reselection (e.g., Release 12). In another example, a measurement of the sidelink discovery message is used for the selection and reselection of the relay (e.g., Release 13). In yet another example, the CBR defines the channel busy ratio measurement for the V2X communication resource pool, e.g., the proportion of the sub-channel whose S-RSSI exceeds the pre-configured threshold within 100 ms. The CBR measurement result is typically applied to the selection of the UE transmission parameters, such as the modulation and coding scheme (MCS), resource block (RB) index, number of retransmissions, etc.

Embodiments of the disclosed technology consider the following factors for implementing sidelink measurements:

1) Consider measurable reference signal types, e.g., CSI-RS, SRS, DMRS, etc.
2) In the high-frequency scenario, the influence of the beam is considered. Furthermore, the measurement results of the plurality of beams are averaged to obtain the RSRP, RSRQ or SINR of the PC5 link.
3) UEs performing unicast communications on the PC5 interface may be mobile or affected by other interference, and thus, a beam selection and management mechanism to adjust the beam used by the UE is considered.

Figure 5:
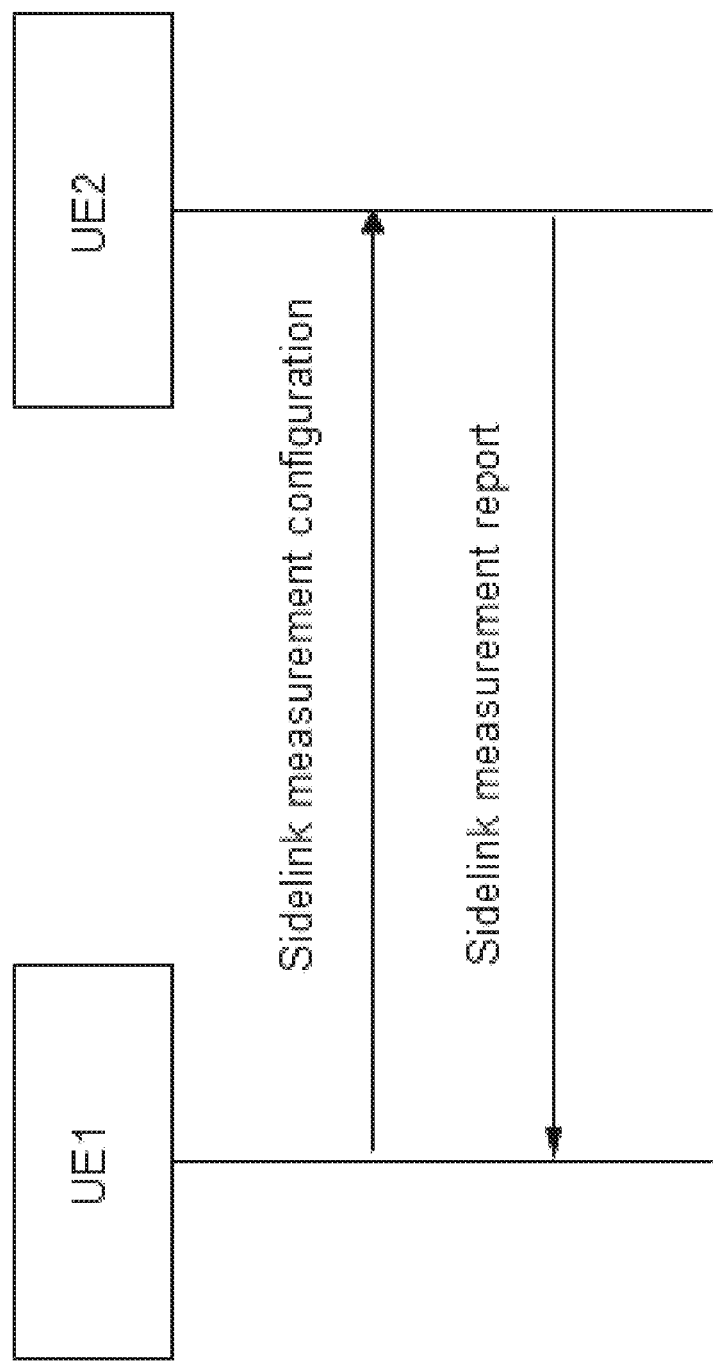
FIG. 5 shows an example of a UE autonomous device-to-device link measurement, in accordance with some embodiments of the presently disclosed technology.
Figure 6:
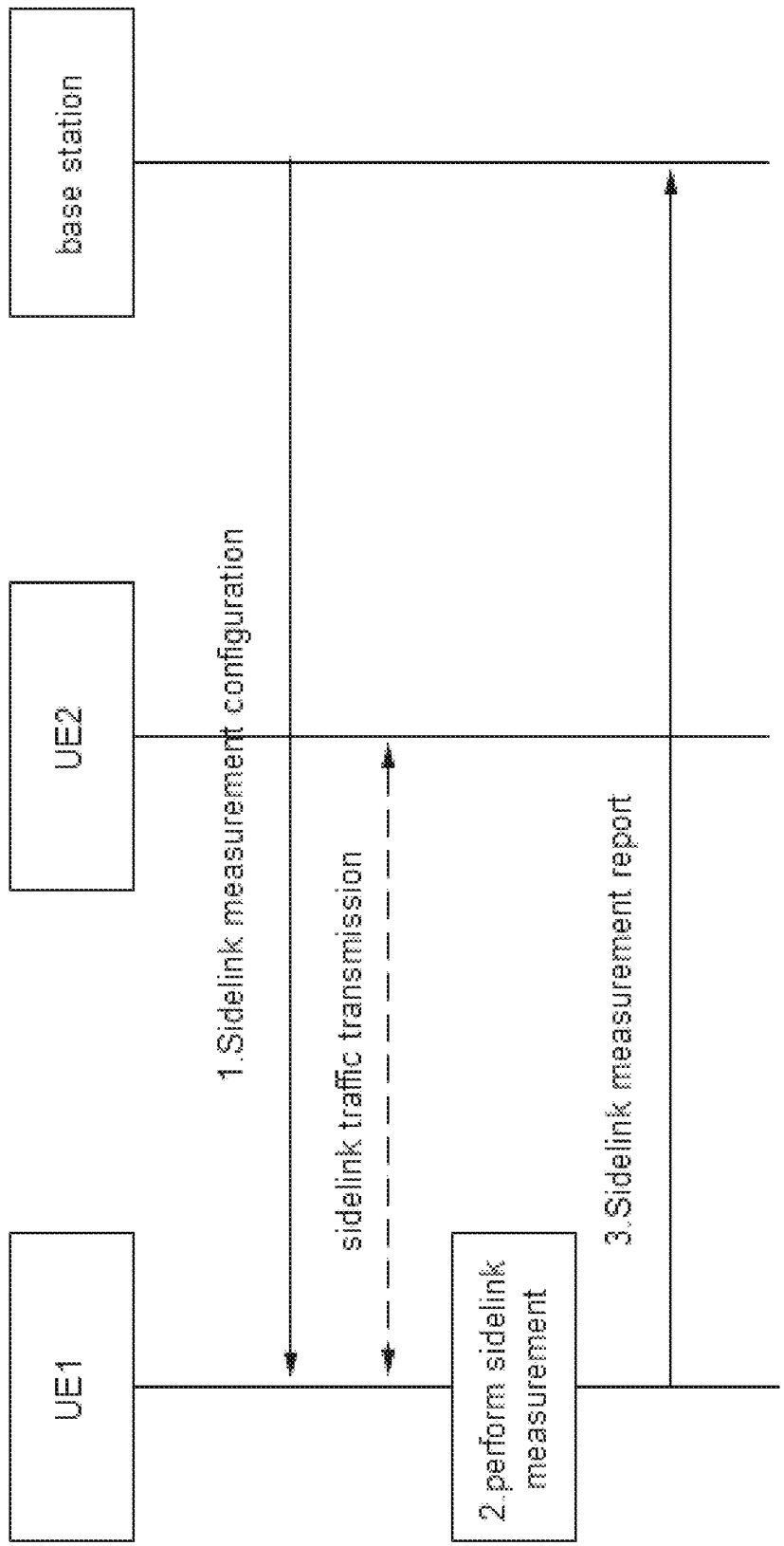
FIG. 6 shows an example of a base station controlled device-to-device link measurement, in accordance with some embodiments of the presently disclosed technology.
Figure 7:
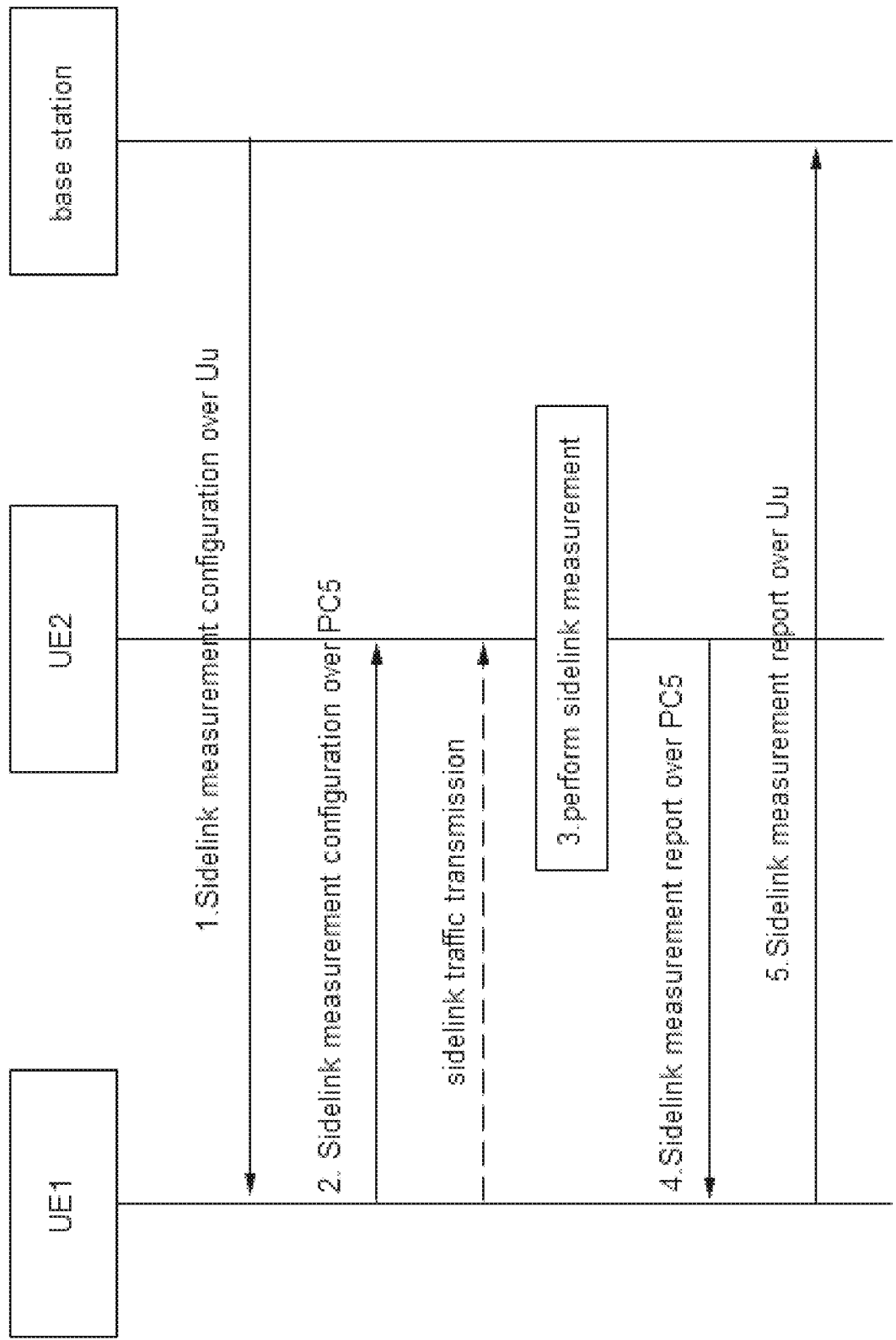
FIG. 7 shows another example of a base station controlled device-to-device link measurement, in accordance with some embodiments of the presently disclosed technology.

Exemplary embodiments of the disclosed technology include:

UE autonomous sidelink measurement. As shown in FIG. 5, UE1 and UE2 establish a unicast connection, and UE1 sends a sidelink measurement configuration to UE2. In some embodiments, the measurement configuration information includes at least one of a sidelink frequency, a sidelink BWP configuration, a subcarrier spacing, a sidelink resource pool, a reference signal resource configuration (e.g., sidelink CSI-RS resource, SSB resource, DMRS resource, SRS resource, etc.), an L3 filtering coefficient (e.g., RSRP, RSRQ, SINR).

As shown in FIG. 5, the sidelink measurement configuration is followed by a sidelink measurement report. In some embodiments, a report configuration information includes at least one of a report type (periodic or event triggered), an event trigger corresponding threshold and/or hysteresis, periodic trigger corresponding period, reference signal type (e.g., SSB, CSI-RS, DMRS, SRS, etc.), parameters for each link, parameters for each beam, reported maximum number of beams N for each link.

In some embodiments, events may include the following examples:

Event S1, wherein the sidelink quality exceeds a threshold
Inequality S1-1 (Entering condition)

$Ms-Hys>Thresh$

Inequality S1-2 (Leaving condition)

$Ms+Hys<Thresh$

Event S2, wherein the sidelink quality is lower than a threshold
Inequality A2-1 (Entering condition)

$Ms+Hys<Thresh$

Inequality A2-2 (Leaving condition)

Ms−Hys>Thresh

In the events described above, Ms is the measurement result of the sidelink for a given frequency, Hys is the (optional) hysteresis parameter for this event, and Thresh is the threshold parameter for this event.

After UE2 receives the measurement configuration from UE1, UE2 may send measurement configuration confirmation or completion information to UE1. Subsequently, UE2 measures the resource and/or the reference signal transmitted by the UE1 according to the sidelink measurement configuration. When the measurement reporting condition is met, UE2 sends a measurement result to the UE1, which includes at least one of the frequency corresponding to the PC5 link, the link measurement value (e.g., as RSRP, RSRQ or SINR) and/or the N best beam indexes and the corresponding measurements. This may be followed by UE1 adjusting the transmit beam used according to the measurement report.

This example is applicable, but not limited to, the scenario where the mode 2 UE autonomously select the resource or where the UE is in the idle state and the inactive state.

Base station controlled sidelink measurement (Example 1). In some embodiments, for a UE in the connected state, the base station can configure the sidelink measurement for the UE. The sidelink measurement configuration sent through the Uu interface can include at least one of a sidelink frequency, a peer UE ID, a target group ID, a sidelink BWP configuration, a subcarrier spacing, a sidelink resource pool, a reference signal resource configuration (e.g., sidelink CSI-RS resource, SSB resource, DMRS resource, SRS resources, etc.), an L3 filtering coefficient (e.g., RSRP, RSRQ, SINR).

In some embodiments, the report configuration information includes at least one of a report type (periodic or event triggered), an event trigger corresponding threshold and/or hysteresis parameter, a periodic trigger corresponding period, a reference signal type (SSB, CSI-RS, DMRS, SRS), parameters for each link, parameters for each beam, and a reported maximum number of beams N for each link.

In some embodiments, it is assumed that the measurement and report configuration sent by the base station to the UE1 includes the measurement of the peer UE2, and the UE1 measures the sidelink transmission sent by the UE2 to the UE1. When the measurement reporting condition is met, the UE1 sends a measurement result to the base station, which can include the frequency corresponding to the PC5 link, link measurement values (e.g., RSRP, RSRQ or SINR), N best beam/reference signal indexes and their corresponding measurement results (e.g., RSRP, RSRQ or SINR).

After receiving the measurement report sent by the UE1, the base station may allocate a dedicated sidelink resource to the UE1 according to the measurement result. The sidelink grant or configured grant allocated to the UE1 may further include the frequency-domain location of the sidelink resource, as well as at least one of a sidelink communication target identification, a beam direction, an MCS, a transmission power, a transmission block (TB) size, retransmission times and other configuration parameters. This example is applicable, but not limited to, a UE that performs model resource scheduling with a base station.

In another example, and for a mode 2 UE, the base station may send a sidelink measurement configuration to the UE. After the sidelink measurement is performed on the peer UE that is performing the sidelink communication, the UE may select the configuration of the beam direction, MCS, transmission power, TB size, and/or number of retransmissions.

Base station controlled sidelink measurement (Example 2). In some embodiments, and for a connected UE, the base station configures the sidelink measurement and reporting for the UE. The specific sidelink measurement configuration sent through the Uu interface can include at least one of a sidelink frequency, a peer UE ID, a target group ID, a sidelink BWP configuration, a subcarrier spacing, a sidelink resource pool, a reference signal resource configuration (e.g., sidelink CSI-RS resource, SSB resource, DMRS resource, SRS resources, etc.), and L3 filtering coefficient (e.g., RSRP, RSRQ, SINR).

In some embodiments, the report configuration information includes at least one of a report type (periodic or event triggered), an event trigger corresponding threshold and/or hysteresis parameter, a periodic trigger corresponding period, a reference signal type (SSB, CSI-RS, DMRS, SRS), quotas for each link, beam parameters for each link, the reported maximum number of beams N for each link, or reported purposes.

Assuming that the measurement and report configuration sent by the base station to UE1 includes the measurement of the peer UE2, UE1 may send the sidelink measurement and report configuration to UE2 through the PC5 interface. In some embodiments, the measurement configuration information includes at least one of a sidelink frequency, a peer UE ID, a target group ID, a sidelink BWP configuration, a subcarrier spacing, a sidelink resource pool, a reference signal resource configuration (e.g., sidelink CSI-RS resource, SSB resource, DMRS resource, SRS resources, etc.), and L3 filtering coefficient (e.g., RSRP, RSRQ, SINR). In some embodiments, the reporting configuration information includes at least one of a report type (periodic or event triggered), an event trigger corresponding threshold and/or hysteresis parameter, a periodic trigger corresponding period, a reference signal type (SSB, CSI-RS, DMRS, SRS), quotas for each link, or the maximum beam number N reported for each beam.

After receiving the measurement and reporting configuration sent by UE1, UE2 measures the sidelink resource or reference signal sent by the UE1. When the measurement reporting condition is met, UE2 sends a sidelink measurement report to UE1, which includes at least one of a frequency corresponding to the PC5 link between UE1 and UE2, a link measurement value (e.g., RSRP, RSRQ or SINR) or the N best beam/reference signal indexes and their corresponding measurement results (e.g., RSRP, RSRQ or SINR). After receiving the sidelink measurement report of UE2, UE1 may send the measurement report information to the base station through the Uu interface, wherein the measurement report information includes at least one of the peer UE ID, the target group ID, the frequency corresponding to the PC5 link to the peer UE2, measured values (e.g., RSRP, RSRQ or SINR) or N best beam indices and corresponding measurements (e.g., RSRP, RSRQ or SINR).

After receiving the measurement report sent by the UE1, the base station may allocate a dedicated sidelink resource to the UE1 according to the measurement result. The sidelink grant or configured grant allocated to the UE1 may include the frequency-domain location of the sidelink resource, as well as at least one of a sidelink communication target identification, a beam direction, an MCS, a transmission power, a TB size, retransmission times and other parameters. In addition, if UE1 and UE2 are served by the same base station, UE2 can directly send the measurement result of the UE1 link to the serving base station. For example, if the UE2 reports the report to the base station from the reporting configuration received by the UE1, UE2 directly reports the measurement result of the sidelink with the UE1 to the serving base station.

In the sidelink measurement configuration, the base station sends a usable reference signal set configuration to UE1, and UE1 selects a reference signal from the set for beam measurement. UE1 then sends the measurement object configuration and report, including the corresponding reference signal, to UE2. UE2 performs measurement and report evaluation according to the configuration, and if necessary, feeds back the measurement report to the transmitting UE1, and UE1 performs beam adjustment according to the corresponding measurement report.

In some embodiments, the transmitting UE may maintain a communication connection with multiple UEs at the same time. Therefore, when transmitting the measurement report to the base station, the transmitting UE needs to include the destination ID of its peer (or opposite) UE in the measurement report, and the base station identifies the measurement as corresponding to that opposite UE. Optionally, the destination ID information may be carried in the measurement object.

In some embodiments, if the peer UE is also continuously transmitting data to the transmitting UE, the transmitting UE may use the measurement of the received data for beam adjustment, and correspondingly, the measurement result of data reception may be reported to the base station for adjust the resource allocation and beam selection.

In addition, after the UE1 reports the sidelink measurement result to the gNB, the base station may further determine, according to the measurement result, whether to start or stop the PC5 unicast communication connection between UE1 and UE2. For example, the base station may send an interface switching indication to UE1, and inform UE1 to transmit the data traffic switch to the Uu interface sent to UE2.

In some embodiments, the UE may also receive an interface switching threshold configuration from the base station, and the UE then determines whether to perform the PC5/Uu interface switching according to whether the current sidelink link quality meets the threshold configured by the base station. For example, if the measured sidelink link quality of the UE is less than the interface switching threshold, the UE switches the unicast data transmission with UE2 to the Uu interface, otherwise the UE may continue to use the sidelink with UE2 for unicast data transmission. In addition to the interface switching threshold, the UE may optionally receive a hysteresis parameter from the base station, so that the UE will switch the unicast data stream with UE2 to the Uu when the sidelink link measurement value between UE1 and UE2—hysteresis is smaller than the interface switching threshold.

Examples of Sidelink Radio Link Monitoring

Single-carrier scenario. In some embodiments, after UE1 and UE2 establish a sidelink unicast communication connection, it may be necessary to detect whether the link quality is sufficient to meet the QoS requirement (such as data rate) corresponding to the data transmission (an operation that is referred to as link maintenance, which is performed by link measurement).

For example, the UE may receive or pre-configure PC5 RLM configuration information, such as N, T, and M values, from the base station. In addition, the UE may receive or pre-configure the maximum retransmission number configuration information from the base station. The PC5 RLM configuration information can be cell-specific, UE-specific or per PC5 link specific. The per PC5 link specific PC5 RLM configuration means that different PC5 RLM configurations can be configured corresponding to different destination IDs.

For example, when the UE detects that there are N "out-of-sync" indications on the PC5 link between itself and the peer UE, the UE starts a timer T. When the timer T is running, if the UE receives M consecutive "in-sync" indications corresponding to the PC5 link to the same peer UE, the UE stops the corresponding timer. If the timer T times out, the link between the UE and the peer UE is considered to have an RLF. In addition, if the data transmission between the UE and the peer UE reaches the maximum number of retransmissions, the RLF of the PC5 link between the UE and the peer UE is also considered to have occurred.

According to the Uu standard, if the UE detects the Uu link RLF, the UE may initiate a re-establishment process. The purpose of the re-establishment is to enable the UE to find a neighboring cell that can acquire the UE context and re-access the network without releasing the established radio bearer. For UE1 and UE2 performing PC5 communication in a single-carrier scenario, and assuming that UE1 detects RLF, UE1 may perform an interface switch, e.g., switch the sidelink data transmission with UE2 to the Uu port, and continue to maintain communication with UE2. Alternatively, UE1 can release the PC5 connection with UE2.

Multi-carrier scenario. For a multi-carrier PC5 communication scenario, UE1 may simultaneously perform sidelink communication with UE2 on multiple carriers (e.g., f1 and f2). After UE1 and UE2 establish a PC5 connection on f1, UE1 and UE2 may also select other carriers for PC5 communication according to the band-combination capability of the UE, the carrier set supported by the service, the data rate or reliability of the data transmission, the carrier congestion condition, the carrier link quality. For example, f2 and f3 may be added for PC5 carrier aggregation (CA) operation. The congestion of f2 and f3, the carrier set supported by the service can be perceived by the transmitting UE itself, and the quality of the carrier link between UE1 and UE2 is detected.

The transmitting UE1 sends a sidelink measurement configuration to the UE2 on the PC5 connection, including f2, f3 and f4, and the corresponding reference signal resource information. Then UE1 sends a reference signal at the corresponding resource location or sends the SCI on the corresponding PSCCH resource for link measurement purposes. After receiving the corresponding reference signal or control information, UE2 measures it and sends a measurement report to UE1. The UE1 determines the aggregation f2 and f3 according to the measurement report of the UE2, and performs sidelink data transmission and reception with the UE2 together with the f1. The subsequent UE1 may continue to determine whether to maintain the aggregation of f2 and f3 according to the measurement feedback of the UE2. Alternatively, UE1 may also perform measurement according to the data sent by UE2 on f2 and f3 to determine whether to maintain the aggregation of f2 and f3.

In some embodiments, and assuming that the quality of the f1 link is degraded, the UE detects the RLM or the measurement result is insufficient to meet the PC5 communication requirements, UE1 and UE2 can continue to maintain the PC5 connection on f2 and f3 without the PC5 connection release and the subsequent PC5 link establishment. Maintenance or PC5 connection release corresponding control signaling can be transmitted on f2 and f3.

In some embodiments, for a PC5 CA for unicast communication, the UE may perform RLM or RRM measurement on multiple carriers, and add or delete a carrier that performs PC5 CA according to the RLM or RRM measurement result. The PC5 CA configuration or reconfiguration and carrier measurement configuration or reconfiguration can be initiated by the data service sending UE according to the service requirement and the available carrier condition of the corresponding service, and the PC5 connection maintenance and configuration or reconfiguration can be executed on the component carrier of any PC5 CA. If the UE detects that there is no suitable carrier for subsequent PC5 communication according to the RLM or RRM measurement result, the UE can implicitly release the PC5 connection, and or perform an interface switch to switch the PC5 data transmission to the Uu interface, and the PC5 connection reestablishment is not required.

Examples of PC5 Link Release

In some embodiments, and after UE1 and UE2 establish a PC5 connection, UE1 or UE2 may initiate a PC5 connection release. In an example, UE1 and or UE2 may receive a base station configuration or a pre-configured PC5data inactivity timer. When UE1 sends or receives the sidelink data sent by UE2 back to UE2, UE1 starts or restarts the PC5data inactivity timer. Similarly, UE2 can also maintain a PC5data inactivity timer. When the PC5data inactivity timer expires, UE1 or UE2 can release the PC5 connection and report it to the upper layer, with the reason for the release being a PC5 connection failure.

In another example, UE1 or UE2's upper layer can also initiate the release. In yet another example, the UE can release the PC5 connection and report it to the upper layer. In yet another example, and when UE1 or UE2 detects RLF and cannot find a suitable carrier for PC5 communication, the UE releases the PC5 connection.

Exemplary Methods for the Disclosed Technology

FIG. 8A shows an example of a wireless communication method 810. The method 810 includes, at step 812, receiving, by a first wireless device, a device-to-device link measurement configuration. The method includes, at step 814, performing a device-to-device link measurement procedure.

FIG. 8B shows an example of a wireless communication method 820. The method 820 includes, at step 822, receiving, by a first wireless device, a device-to-device link monitoring configuration. The method includes, at step 824, performing a device-to-device link monitoring procedure.

FIG. 8C shows an example of a wireless communication method 830. The method 830 includes, at step 832, receiving, by a first wireless device, a device-to-device link maintenance configuration. The method includes, at step 834, performing a device-to-device link maintenance procedure.

FIG. 8D shows an example of a wireless communication method 840. The method 840 includes, at step 842, transmitting, to a first wireless device, a device-to-device link measurement configuration. In some embodiments, the first wireless device is enabled to perform a device-to-device link measurement procedure.

FIG. 8E shows an example of a wireless communication method 850. The method 850 includes, at step 852, transmitting, to a first wireless device, a device-to-device link monitoring configuration. In some embodiments, the first wireless device is enabled to perform a device-to-device link monitoring procedure.

FIG. 8F shows an example of a wireless communication method 860. The method 860 includes, at step 862, transmitting, to a first wireless device, a device-to-device link maintenance configuration. In some embodiments, the first wireless device is enabled to perform a device-to-device link maintenance procedure.

Some embodiments and techniques related to methods 810, 820, 830, 840, 850 and 860 may be described using the following clause-based description.

1. A method for wireless communication, comprising receiving, by a first wireless device, a device-to-device link measurement configuration; and performing a device-to-device link measurement procedure.

2. A method for wireless communication, comprising receiving, by a first wireless device, a device-to-device link monitoring configuration; and performing a device-to-device link monitoring procedure.

3. A method for wireless communication, comprising receiving, by a first wireless device, a device-to-device link maintenance configuration; and performing a device-to-device link maintenance procedure.

4. A method for wireless communication, comprising transmitting, to a first wireless device, a device-to-device link measurement configuration, wherein the first wireless device is enabled to perform a device-to-device link measurement procedure.

5. A method for wireless communication, comprising transmitting, to a first wireless device, a device-to-device link monitoring configuration, wherein the first wireless device is enabled to perform a device-to-device link monitoring procedure.

6. A method for wireless communication, comprising transmitting, to a first wireless device, a device-to-device link maintenance configuration, wherein the first wireless device is enabled to perform a device-to-device link maintenance procedure.

7. The method of any of clauses 4 to 6, wherein a network node or a second wireless device is enabled to transmit to the first wireless device.

8. The method of clause 1 or 4, wherein measurement configuration comprises at least one of a time-domain location of a resource, a frequency-domain location of the resource or a configuration for a reference signal.

9. The method of clause 1 or 4, wherein measurement configuration comprises a time-domain location of a resource.

10. The method of clause 1 or 4, wherein measurement configuration comprises a frequency-domain location of the resource.

11. The method of clause 1 or 4, wherein measurement configuration comprises a configuration for a reference signal.

12. The method of clause 1 or 4, wherein the measurement configuration further comprises at least one of a sidelink UE ID, a reference signal, a number of reference signals to average, a sidelink carrier frequency, a sidelink bandwidth part (BWP) configuration, a subcarrier spacing, a sidelink resource pool configuration or a Layer 3 (L3) filtering coefficient.

13. The method of clause 1 or 4, wherein the measurement configuration further comprises a sidelink UE ID.

14. The method of clause 1 or 4, wherein the measurement configuration further comprises a reference signal.

15. The method of clause 1 or 4, wherein the measurement configuration further comprises a number of reference signals to average.

16. The method of clause 1 or 4, wherein the measurement configuration further comprises a sidelink carrier frequency.

17. The method of clause 1 or 4, wherein the measurement configuration further comprises a sidelink bandwidth part (BWP) configuration.
18. The method of clause 1 or 4, wherein the measurement configuration further comprises a subcarrier spacing.
19. The method of clause 1 or 4, wherein the measurement configuration further comprises a sidelink resource pool configuration.
20. The method of clause 1 or 4, wherein the measurement configuration further comprises a Layer 3 (L3) filtering coefficient.
21. The method of clause 1 or 4, wherein the first wireless device is enabled to receive a sidelink measurement report configuration.
22. The method of clause 10, wherein the sidelink measurement report configuration comprises at least one of a report type, a reference signal, an event trigger configuration, a periodic report configuration, a report interval, a report amount or a report format.
23. The method of clause 10, wherein the sidelink measurement report configuration comprises a report type.
24. The method of clause 10, wherein the sidelink measurement report configuration comprises a reference signal.
25. The method of clause 10, wherein the sidelink measurement report configuration comprises an event trigger configuration.
26. The method of clause 10, wherein the sidelink measurement report configuration comprises a periodic report configuration.
27. The method of clause 10, wherein the sidelink measurement report configuration comprises a report interval.
28. The method of clause 10, wherein the sidelink measurement report configuration comprises a report amount.
29. The method of clause 10, wherein the sidelink measurement report configuration comprises a report format.
30. The method of clause 23, wherein the report type is periodic.
31. The method of clause 23, wherein the report type is event-triggered.
32. The method of clause 24, wherein the reference signal is a sidelink channel state information-reference signal (CSI-RS) resource.
33. The method of clause 24, wherein the reference signal is a synchronization signal block (SSB) resource.
34. The method of clause 24, wherein the reference signal is a sounding reference signal (SRS) resource.
35. The method of clause 24, wherein the reference signal is a demodulation reference signal (DMRS) resource.
36. The method of clause 25, wherein the event trigger configuration comprises a threshold or a hysteresis parameter for each event.
37. The method of clause 25, wherein the event trigger configuration comprises a threshold for each event.
38. The method of clause 25, wherein the event trigger configuration comprises a hysteresis parameter for each event.
39. The method of clause 29, wherein the report format comprises at least one of parameters for each sidelink, parameters for each beam and a maximum reported beam number.
40. The method of clause 29, wherein the report format comprises parameters for each sidelink.
41. The method of clause 29, wherein the report format comprises parameters for each beam.
42. The method of clause 29, wherein the report format comprises a maximum reported beam number.
43. The method of clause 39, wherein the parameters for each sidelink comprise a sidelink UE ID, a reference signal received power (RSRP), a reference signal received quality (RSRQ) or a signal to interference plus noise ratio (SINR).
44. The method of clause 39, wherein the parameters for each sidelink comprise a sidelink UE ID.
45. The method of clause 39, wherein the parameters for each sidelink comprise a reference signal received power (RSRP).
46. The method of clause 39, wherein the parameters for each sidelink comprise a reference signal received quality (RSRQ).
47. The method of clause 39, wherein the parameters for each sidelink comprise a signal to interference plus noise ratio (SINR).
48. The method of clause 39, wherein the parameters for each beam comprise a reference signal index, a reference signal received power (RSRP), a reference signal received quality (RSRQ) or a signal to interference plus noise ratio (SINR).
49. The method of clause 39, wherein the parameters for each beam comprise a reference signal index.
50. The method of clause 39, wherein the parameters for each beam comprise a reference signal received power (RSRP).
51. The method of clause 39, wherein the parameters for each beam comprise a reference signal received quality (RSRQ).
52. The method of clause 39, wherein the parameters for each beam comprise a signal to interference plus noise ratio (SINR).
53. The method of clause 8 or 12, wherein the reference signal comprises at least one of a sidelink channel state information-reference signal (CSI-RS) resource, a synchronization signal block (SSB) resource, a sounding reference signal (SRS) resource or a demodulation reference signal (DMRS) resource.
54. The method of clause 12, wherein the L3 filtering coefficient is at least one of a reference signal received power (RSRP), a reference signal received quality (RSRQ) or a signal to interference plus noise ratio (SINR).
55. The method of any of clauses 1 to 3, further comprising transmitting, to a network node or a second wireless device, a device-to-device link measurement result or a device-to-device link status.
56. The method of clause 55, wherein the device-to-device link status comprises at least one of a device-to-device link failure indication, a UE ID, an ID, a device-to-device link setup indication or a device-to-device link release indication.
57. The method of clause 55, wherein the device-to-device link status comprises a device-to-device link failure indication.
58. The method of clause 55, wherein the device-to-device link status comprises a UE ID.
59. The method of clause 55, wherein the device-to-device link status comprises an ID.
60. The method of clause 55, wherein the device-to-device link status comprises a device-to-device link setup indication.

61. The method of clause 55, wherein the device-to-device link status comprises a device-to-device link release indication.
62. The method of clause 55, wherein the device-to-device link measurement result comprises at least one of a sidelink carrier frequency, a result for each sidelink, or a result for each reference signal or beam.
63. The method of clause 55, wherein the device-to-device link measurement result comprises a sidelink carrier frequency.
64. The method of clause 55, wherein the device-to-device link measurement result comprises a result for each sidelink.
65. The method of clause 55, wherein the device-to-device link measurement result comprises a result for each reference signal or beam.
66. The method of clause 62, wherein the result for each sidelink comprises a sidelink UE ID and a measurement result parameter, wherein the result for each reference signal or beam comprises the sidelink UE ID, a reference signal or beam index and the measurement result parameter, and wherein the measurement result parameter is at least one of a reference signal received power (RSRP), a reference signal received quality (RSRQ) or a signal to interference plus noise ratio (SINR).
67. The method of clause 55, wherein the second wireless device is enabled to adjust, upon reception of the device-to-device link measurement result, a sidelink transmission parameter.
68. The method of clause 55, wherein the second wireless device is enabled to transmit, upon reception of the device-to-device link measurement result, the device-to-device link measurement result to the network node.
69. The method of clause 55, wherein the network node is enabled to adjust, upon reception of the device-to-device link measurement result, a sidelink transmission parameter for the second wireless device.
70. The method of clause 67 or 69, wherein the sidelink transmission parameter comprises at least one of a modulation and coding scheme (MCS), a beam direction, a transmission power, a number of retransmissions or a transmission block size.
71. The method of clause 2 or 5, wherein the monitoring configuration comprising at least one of a sidelink UE ID, an out-of-sync timer (T), a counter for consecutive out-of-sync indications received from a lower layer (N), a counter for consecutive in-sync indications received from the lower layer (M) or a maximum number of allowed retransmissions.
72. The method of clause 71, wherein the first wireless device is enabled to start the out-of-sync timer (T) based on the counter for the consecutive out-of-sync indications received from a lower layer (N) crossing a first threshold for a device-to-device link on a given carrier.
73. The method of clause 72, wherein the first wireless device is enabled to determine that the out-of-sync timer (T) is running, and stopping the out-of-sync timer (T) based on the counter for the consecutive in-sync indications received from the lower layer (M) crossing a second threshold for the device-to-device link on the given carrier.
74. The method of clause 72, wherein the first wireless device is enabled to declare, upon expiration of the out-of-sync timer (T), a sidelink failure for the device-to-device link on the given carrier.
75. The method of clause 71, wherein multiple carriers are aggregated for a transmission on the device-to-device link, and wherein a radio link failure (RLF) for the device-to-device link is declared upon detection of link failures on each of the multiple carriers.
76. The method of clause 3 or 6, wherein the maintenance configuration comprising at least one of a sidelink connection setup threshold, a sidelink connection release threshold or a sidelink inactivity timer.
77. The method of clause 76, wherein the first wireless device is enabled to initiate, upon determining a measurement result of a sidelink between the first wireless device and the second wireless device is greater than the sidelink connection setup threshold, a sidelink connection setup.
78. The method of clause 76, wherein the first wireless device is enabled to release, upon determining a measurement result of a sidelink between the first wireless device and the second wireless device is lower than the sidelink connection setup threshold, a sidelink connection.
79. The method of clause 76, wherein the first wireless device is enabled to release, upon determining that no data has been transmitted on an established sidelink connection for a duration of the sidelink inactivity timer, the established sidelink connection.
80. The method of any of clauses 1 to 79, wherein the device-to-device link is a sidelink.
81. The method of clause 80, wherein the sidelink is direct link between a first user equipment (UE) and a second UE.

Implementations for the Disclosed Technology

Figure 9:
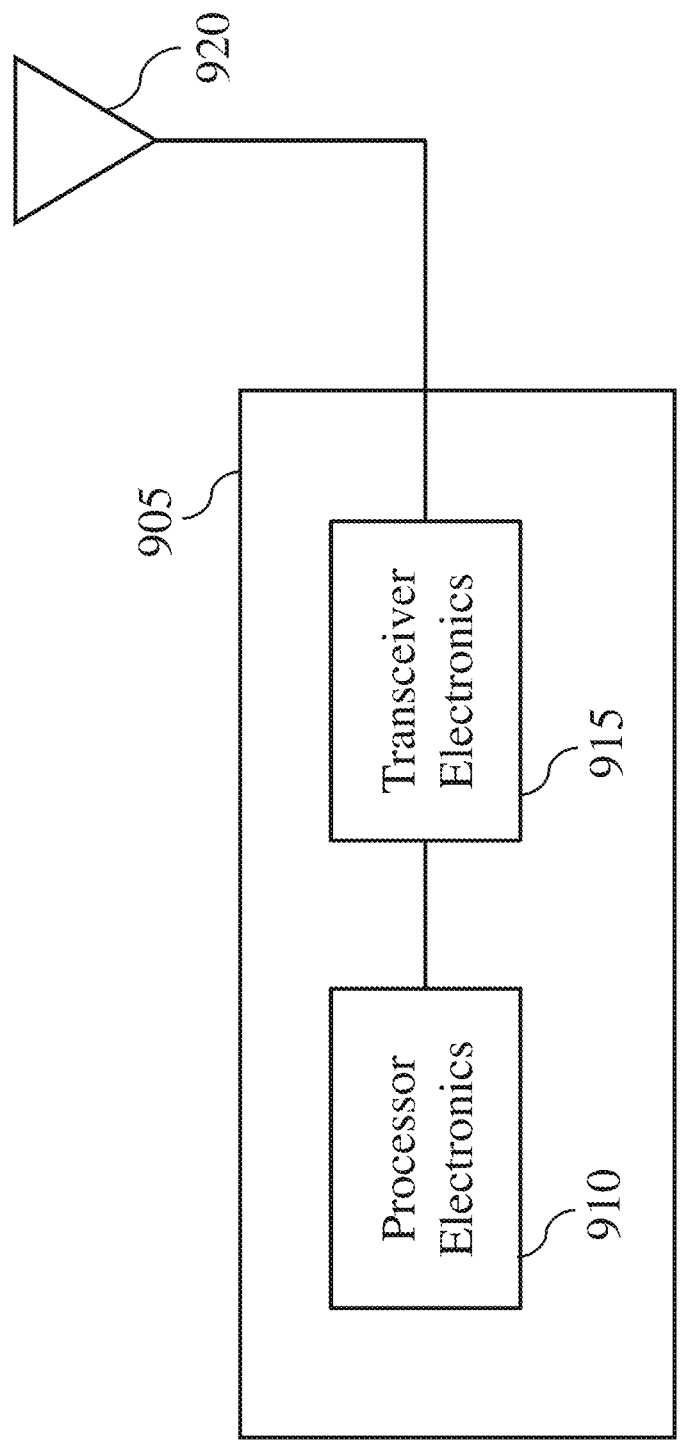
FIG. 9 is a block diagram representation of a portion of an apparatus, in accordance with some embodiments of the presently disclosed technology.

FIG. 9 is a block diagram representation of a portion of an apparatus, in accordance with some embodiments of the presently disclosed technology. An apparatus 905, such as a base station or a wireless device (or UE), can include processor electronics 910 such as a microprocessor that implements one or more of the techniques presented in this document. The apparatus 905 can include transceiver electronics 915 to send and/or receive wireless signals over one or more communication interfaces such as antenna(s) 920. The apparatus 905 can include other communication interfaces for transmitting and receiving data. Apparatus 905 can include one or more memories (not explicitly shown) configured to store information such as data and/or instructions. In some implementations, the processor electronics 910 can include at least a portion of the transceiver electronics 915. In some embodiments, at least some of the disclosed techniques, modules or functions are implemented using the apparatus 905.

It is intended that the specification, together with the drawings, be considered exemplary only, where exemplary means an example and, unless otherwise stated, does not imply an ideal or a preferred embodiment. As used herein, the use of "or" is intended to include "and/or", unless the context clearly indicates otherwise.

Some of the embodiments described herein are described in the general context of methods or processes, which may be implemented in one embodiment by a computer program product, embodied in a computer-readable medium, including computer-executable instructions, such as program code, executed by computers in networked environments. A computer-readable medium may include removable and non-removable storage devices including, but not limited to, Read Only Memory (ROM), Random Access Memory (RAM), compact discs (CDs), digital versatile discs (DVD), etc. Therefore, the computer-readable media can include a non-transitory storage media. Generally, program modules may include routines, programs, objects, components, data structures, etc. that perform particular tasks or implement particular abstract data types. Computer- or processor-executable instructions, associated data structures, and program modules represent examples of program code for executing steps of the methods disclosed herein. The particular sequence of such executable instructions or associated data structures represents examples of corresponding acts for implementing the functions described in such steps or processes.

Some of the disclosed embodiments can be implemented as devices or modules using hardware circuits, software, or combinations thereof. For example, a hardware circuit implementation can include discrete analog and/or digital components that are, for example, integrated as part of a printed circuit board. Alternatively, or additionally, the disclosed components or modules can be implemented as an Application Specific Integrated Circuit (ASIC) and/or as a Field Programmable Gate Array (FPGA) device. Some implementations may additionally or alternatively include a digital signal processor (DSP) that is a specialized microprocessor with an architecture optimized for the operational needs of digital signal processing associated with the disclosed functionalities of this application. Similarly, the various components or sub-components within each module may be implemented in software, hardware or firmware. The connectivity between the modules and/or components within the modules may be provided using any one of the connectivity methods and media that is known in the art, including, but not limited to, communications over the Internet, wired, or wireless networks using the appropriate protocols.

While this document contains many specifics, these should not be construed as limitations on the scope of an invention that is claimed or of what may be claimed, but rather as descriptions of features specific to particular embodiments. Certain features that are described in this document in the context of separate embodiments can also be implemented in combination in a single embodiment. Conversely, various features that are described in the context of a single embodiment can also be implemented in multiple embodiments separately or in any suitable sub-combination. Moreover, although features may be described above as acting in certain combinations and even initially claimed as such, one or more features from a claimed combination can in some cases be excised from the combination, and the claimed combination may be directed to a sub-combination or a variation of a sub-combination. Similarly, while operations are depicted in the drawings in a particular order, this should not be understood as requiring that such operations be performed in the particular order shown or in sequential order, or that all illustrated operations be performed, to achieve desirable results.

Only a few implementations and examples are described and other implementations, enhancements and variations can be made based on what is described and illustrated in this disclosure.

What is claimed is:

1. A method for wireless communication, comprising:
 receiving, by a first wireless device, a device-to-device link measurement configuration, wherein the device-to-device link measurement configuration includes a value indicating a peer wireless device, a sidelink carrier frequency, and a Layer 3 (L3) filtering coefficient;
 performing, by the first wireless device, a device-to-device link measurement procedure based on the device-to-device link measurement configuration;
 transmitting, by the first wireless device to the peer wireless device, a device-to-device link measurement result; and
 transmitting, by the first wireless device to a network node, a device-to-device link status,
 wherein the device-to-device link status comprises a device-to-device link failure indication and a UE ID.

2. The method of claim 1, further comprising:
 receiving, by the first wireless device, a sidelink measurement report configuration comprising a reference signal, an event trigger configuration, a periodic report configuration, a report interval, and a report amount.

3. The method of claim 2, wherein the event trigger configuration comprises a threshold and a hysteresis parameter for each event.

4. The method of claim 2, wherein the reference signal comprises a demodulation reference signal (DMRS).

5. The method of claim 1, wherein the device-to-device link measurement result comprises a result for each sidelink, the result for each sidelink including a reference signal received power (RSRP) measurement.

6. A method for wireless communication, comprising:
 transmitting, by a network node to a first wireless device, a device-to-device link measurement configuration,
 wherein the device-to-device link measurement configuration includes a value indicating a peer wireless device, a sidelink carrier frequency, and a Layer 3 (L3) filtering coefficient, and
 wherein the first wireless device is enabled to: (1) perform a device-to-device link measurement procedure based on the device-to-device link measurement configuration, and (2) in response, transmit, to the peer wireless device, a device-to-device link measurement result; and
 receiving, from the first wireless device, a device-to-device link status, wherein the device-to-device link status comprises a device-to-device link failure indication and a UE ID.

7. The method of claim 6, wherein the first wireless device is enabled to receive a sidelink measurement report configuration comprising a reference signal, an event trigger configuration, a periodic report configuration, a report interval, and a report amount.

8. The method of claim 7, wherein the event trigger configuration comprises a threshold and a hysteresis parameter for each event.

9. The method of claim 7, wherein the reference signal comprises a demodulation reference signal (DMRS).

10. The method of claim 6, wherein the device-to-device link measurement result comprises a result for each sidelink, the result for each sidelink including a reference signal received power (RSRP) measurement.

11. A wireless communications apparatus comprising a processor and a memory storing instructions, execution of which by the processor causes the apparatus to:
 receive a device-to-device link measurement configuration, wherein the device-to-device link measurement configuration includes a value indicating a peer wireless device, a sidelink carrier frequency, and a Layer 3 (L3) filtering coefficient;
 perform, by the apparatus, a device-to-device link measurement procedure based on the device-to-device link measurement configuration;
 transmit, to the peer wireless device, a device-to-device link measurement result; and transmit, to a network node, a device-to-device link status, wherein the device-to-device link status comprises a device-to-device link failure indication and a UE ID.

12. The apparatus of claim 11, wherein the apparatus is further caused to:

receive, by the apparatus, a sidelink measurement report configuration comprising a reference signal, an event trigger configuration, a periodic report configuration, a report interval, and a report amount.

13. The apparatus of claim 12, wherein the event trigger configuration comprises a threshold and a hysteresis parameter for each event.

14. The apparatus of claim 12, wherein the reference signal comprises a demodulation reference signal (DMRS).

15. The apparatus of claim 11, wherein the device-to-device link measurement result comprises a result for each sidelink, the result for each sidelink including a reference signal received power (RSRP) measurement.

16. A wireless communications apparatus comprising a processor and a memory storing instructions, execution of which by the processor causes the apparatus to:

transmit, to a first wireless device, a device-to-device link measurement configuration, wherein the device-to-device link measurement configuration includes a value indicating a peer wireless device, a sidelink carrier frequency, and a Layer 3 (L3) filtering coefficient, and wherein the first wireless device is enabled to: (1) perform a device-to-device link measurement procedure based on the device-to-device link measurement configuration, and (2) in response, transmit, to the peer wireless device, a device-to-device link measurement result; and receive, from the first wireless device, a device-to-device link status, wherein the device-to-device link status comprises a device-to-device link failure indication and a UE ID.

17. The apparatus of claim 16, wherein the first wireless device is enabled to receive a sidelink measurement report configuration comprising a reference signal, an event trigger configuration, a periodic report configuration, a report interval, and a report amount.

18. The apparatus of claim 17, wherein the event trigger configuration comprises a threshold and a hysteresis parameter for each event.

19. The apparatus of claim 17, wherein the reference signal comprises a demodulation reference signal (DMRS).

20. The apparatus of claim 16, wherein the device-to-device link measurement result comprises a result for each sidelink, the result for each sidelink including a reference signal received power (RSRP) measurement.

* * * * *